United States Patent [19]

Hummel

[11] 4,253,860
[45] Mar. 3, 1981

[54] HEATED LANCE ROOF CLEANING PROCESS

[75] Inventor: Merritt J. Hummel, New Kensington, Pa.

[73] Assignee: PPG Industries, Inc., Pittsburgh, Pa.

[21] Appl. No.: 62,830

[22] Filed: Aug. 1, 1979

[51] Int. Cl.³ .............................................. C03B 18/16
[52] U.S. Cl. ....................................... 65/27; 65/99 A
[58] Field of Search ..................... 65/99 A, 182 R, 27

[56] References Cited

U.S. PATENT DOCUMENTS

| | | | |
|---|---|---|---|
| 1,553,773 | 9/1925 | Heal | 65/152 R X |
| 3,337,319 | 8/1967 | Edwards | 65/27 |
| 3,337,320 | 8/1967 | Dyck | 65/99 A |
| 3,494,755 | 2/1970 | Montgomery | 65/27 |
| 3,549,343 | 12/1970 | Loukes | 65/30 |
| 3,597,178 | 8/1971 | Tilton | 65/27 |
| 3,811,854 | 5/1974 | Pecoraro | 65/27 |
| 4,019,885 | 4/1977 | Snow | 65/99 A |

*Primary Examiner*—Arthur D. Kellogg
*Attorney, Agent, or Firm*—Dennis G. Millman; Paul A. Leipold

[57] ABSTRACT

The method of improving the cleaning of float forming chamber roofs is disclosed. The method involves the use of heated forming or nitrogen gas which is directed against the surface of the roof. In a preferred embodiment, hydrogen sulfide or other sulfur containing gas is added to the gas directed against the roof in order to aid in cleaning by converting elemental tin to tin sulfide which will sublimate at the temperature of the heated gas.

9 Claims, 2 Drawing Figures

HEATED LANCE ROOF CLEANING PROCESS

BACKGROUND OF THE INVENTION

1. Field of the Invention

The field of the invention relates to the manufacture of float glass and more particularly to a method for preventing defects resulting from metal dripping from the ceiling of the forming chamber above the metal bath within the forming chamber onto the glass ribbon passing through the chamber.

2. Prior Art

The manufacture of flat glass by the float process involves delivering glass at a controlled rate onto a relatively wide bath of molten metal (normally tin) and advancing it along the bath surface of molten metal under conditions which assure that a sheet of glass of a desired thickness and optical property may be withdrawn at the exit end of the forming chamber. Above the bath of molten metal, the forming chamber holding the molten metal has a headspace containing a reducing to inert atmosphere, a refractory ceiling extends over the headspace and above the ceiling a plenum or headspace for introduction of a forming or nitrogen gas which enters the headspace through the ceiling and prevents deterioration of the metal bath. The plenum also contains the electrical connections for the candle heating elements utilized in the bath.

The forming gas is normally nitrogen with some small percentage of hydrogen. The purpose of the forming gas is to prevent the oxidation of the tin. The forming chamber is tightly closed and a positive pressure of the forming or nitrogen gas is maintained in the forming chamber to prevent the ingress of air containing oxygen. While the conventional practice has resulted in production of fine quality glass there remains a continuing difficulty with a defect known as "tin drip" which results from droplets of molten tin which are on the upper surface of the glass when it is removed from the forming chamber. These tin drips are the result of dripping from the ceiling of the forming chamber. The occurrence of tin drip is a chronic problem in the operation of the forming chamber, but is of particular difficulty when a temperature change is required in the forming chamber. The heating of the roof candles results in affecting the viscosity, surface tension and chemical reactivity of tin droplets on and near the candles leading to their agglomeration and falling from the roof onto the glass. It would be desirable to minimize the formation of elemental tin droplets on the candle and roof structure of the forming chamber.

In U.S. Pat. No. 4,019,855 to Snow it is suggested that the problem of tin drip be reduced by utilization of a halogen or halide fluxing agent which when utilized at infrequent intervals would cause the molten metal deposits on the roof to coalesce and drop onto the glass ribbon or molten metal bath at controlled occasions.

In U.S. Pat. No. 3,597,178 to Tilton and in U.S. Pat. No. 3,494,755 to Montgomery, it is suggested that the tin be condensed in a controlled manner onto a structure within the forming chamber in order to control it in a manner in which it does not drip onto the glass ribbon but rather onto the tin. In Montgomery a curved support overhangs the glass ribbon in such a manner that the tin droplets drip off the edge of the support in an area beyond that covered by the glass ribbon. In Tilton a wire mesh material is passed through the forming chamber where it collects volatiles for removal to an area outside the bath where the screen is cleaned.

It is also known to use lances of ambient temperature forming or nitrogen gas to try and blow tin and other deposits from the roof of the forming chamber. In U.S. Pat. No. 3,811,854 it is disclosed that stones in the furnace refiner roof may be removed by blowing gas at the roof deposits.

There remains a need for a method of minimizing roof contamination and tin drip in the forming chamber without the addition of expensive and complicated apparatus to the chamber and without introducing gases or other chemicals which bring a new material into the forming chamber environment that may contaminate the glass or shorten the life of refractories within the bath. Further, it is important than any material utilized to reduce tin drip does not contaminate the molten metal bath or the glass. A control method not involving process interruptions is also desirable.

SUMMARY OF THE INVENTION

It is an object of this invention to overcome problems of the prior art.

It is another object of this invention to form glass of beter quality.

It is an additional object of this invention to reduce the frequency of the need ro cleaning of the inside of forming chamber roofs.

It is a further object of this invention to improve roof blow down cleaning efficiency.

It is another object of this invention to reduce tin drip defects in float glass.

These and other objects of the invention are generally accomplished by heating of the gas utilized in a lance to blow down deposits from the roof of the forming chamber. The gas is heated sufficiently that it is in the range where tin sulfide deposited on the roof will rapidly be sublimed. In a particularly preferred embodiment, the gases from the lance are heated to between about 1100° F. (about 750° C.) and 1620° F. (882° C.) the melting point of SnS because of the rapid sublimation of the tin sulfide at this temperature. In another embodiment, hydrogen sulfide is added to the nitrogen or forming gas utilized in the lance in order to cause the elemental tin on the roof to convert to tin sulfide which will sublime in the heat of the lance gases.

DETAILED DESCRIPTION OF THE INVENTION

Figure 1:
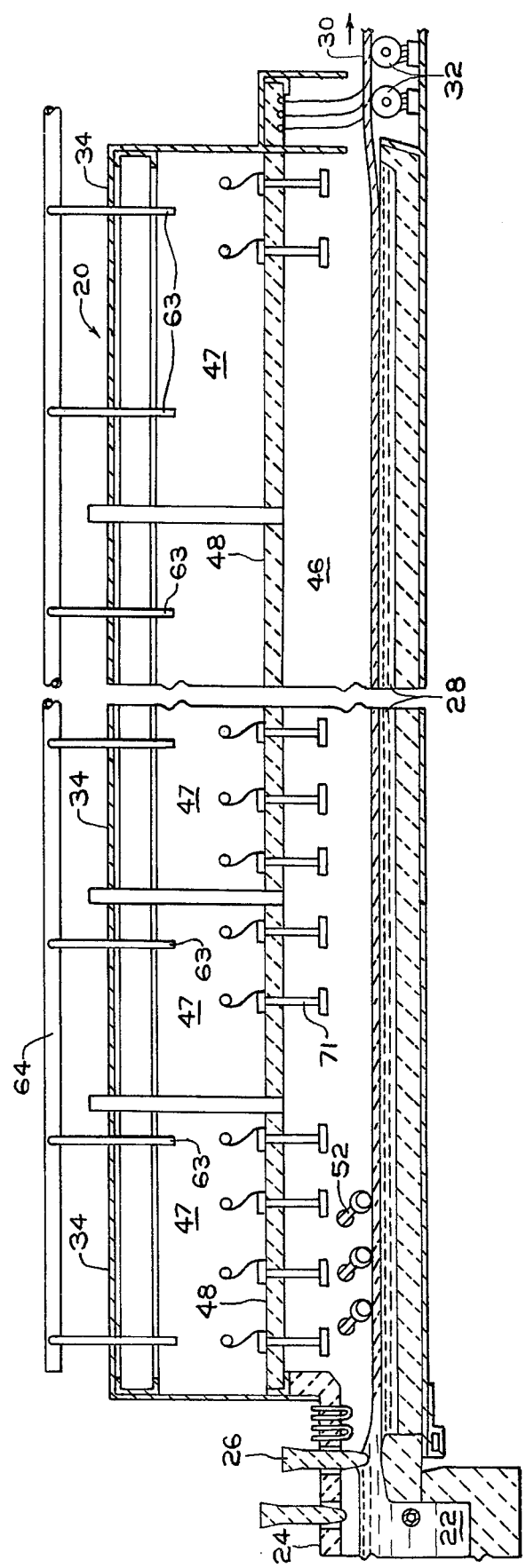
FIG. 1 is a side elevated view of a forming chamber suitable for use with the invention.

The instant invention has numerous advantages over the prior processes involving the use of lances having ambient air temperature forming gas or nitrogen. Such gases when expelled at high velocity are sufficient to dislodge contaminants on the roof. However, if the contaminants are not loose the expelling of the cold ambient temperature gases has the effect of freezing contaminants such as tin or adhered tin sulfide to the roof rather than dislodging such contaminants. By the inventive process here disclosed, both the mechanical and chemical cleaning of the roof is aided. The invention will be described in more detail with reference to a particular forming chamber as illustrated in the drawings.

With reference to FIG. 1, there is shown a conventional forming chamber 20 of the type taught in U.S. Pat. No. 3,976,460, which teachings are hereby incorporated by reference. In general, glass making ingredients are fed into and melted in a melter (not shown) to make molten glass 22. The molten glass flows downstream into a refiner 24 where the molten glass is fined and conditioned. Thereafter, the molten glass is controllably flowed past tweel 26 into a pool of molten metal 28 contained in the glass forming chamber 20. As the molten glass flows on the molten tin it is selectively and controllably cooled and sized to a dimensionally stable glass ribbon 30. The thickness of the ribbon is controlled by edge control machines illustrated as 52 which provide force to the glass to form it into a thickness either greater or less than equilibrium thickness. The head space 46 of the forming chamber is separated from the service area or plenum by the ceiling 48 of the forming chamber. Steel plate 34 forms the upper ceiling and sides of the plenum area. Forming gas or nitrogen gas enters the plenum from pipe 63 extending through the roof plate 34. The pipe 63 is connected to forming gas manifold distribution pipe 64 by connecting gas line 65. The manifold 64 is connected to a source (not shown) of forming gases.

The candles 71 are utilized to heat various portions of the glass passing through the forming chamber in order to control the cooling profile of the glass. The candles 71 are quite numerous there being at least several hundred in the forming chamber. The candles 71 conventionally having three heater elements, rest on a ceramic members 70. They are supported by the ceiling 48 and are connected to bus bar 73 which extends through electrically insulated collar 4 mounted in the upper casing 34 and are connected to a source of electric power (not shown). The heaters 71 are connected to the bus bar 73 by connecting straps 75 and electric power is provided to the bus bars by a power cable 76. The connecting straps 75 are connected to the heaters and the bus bars respectively by conductors 77 and 79. The ceramic pieces 70 support the candle members which are loosely resting on them. The collars allow ingress of forming or nitrogen gas from the plenum area 47 into the head space of the forming chamber 46. As the forming gas circulates in the head space 46, some of the gases invariably leak back towards the plenum area 47. Such gases as they cool deposit contaminants from the forming chamber onto the candles 71 and the collar 70. The forming chamber atmosphere contaminants also deposit onto the roof 48. When the candles are increased in power or turned on any tin which is deposited on the roof or candles tends to condense and drip onto the glass.

While the chemistry of the bath ceiling contamination is not completely understood, it is believed that the primary source of tin on the roof is the evaporation of tin sulfide from the tin bath. It may be possible that some contamination is direct vapor deposition of the tin from the bath which condenses onto the roof. However, it is believed that the primary source is tin sulfur compounds primarily tin sulfide evaporating directly from the bath. The sulfur enters the bath from the glass ribbon as it passes over the bath in the forming chamber. The tin sulfide after depositing onto the roof and candles, particularly inside the collar pieces surrounding the candles is reduced by the hydrogen gas present in the forming gas to form elemental tin. It is also possible that some of the tin sulfide (SnS) can be converted to elemental tin by the disproportionation of tin sulfide into tin and tin disulfide ($SnS_2$): symbolically $2SnS \rightarrow Sn + SnS_2$. Tin sulfide condenses at less than about 800° F. (about 425° C.). At higher temperatures the tin sulfides will sublime at a much greater rate than elemental tin. Therefore, when the candles are increased in heat, the tin sulfide formed by the instant invention is likely to sublime while elemental tin will drip.

Figure 2:
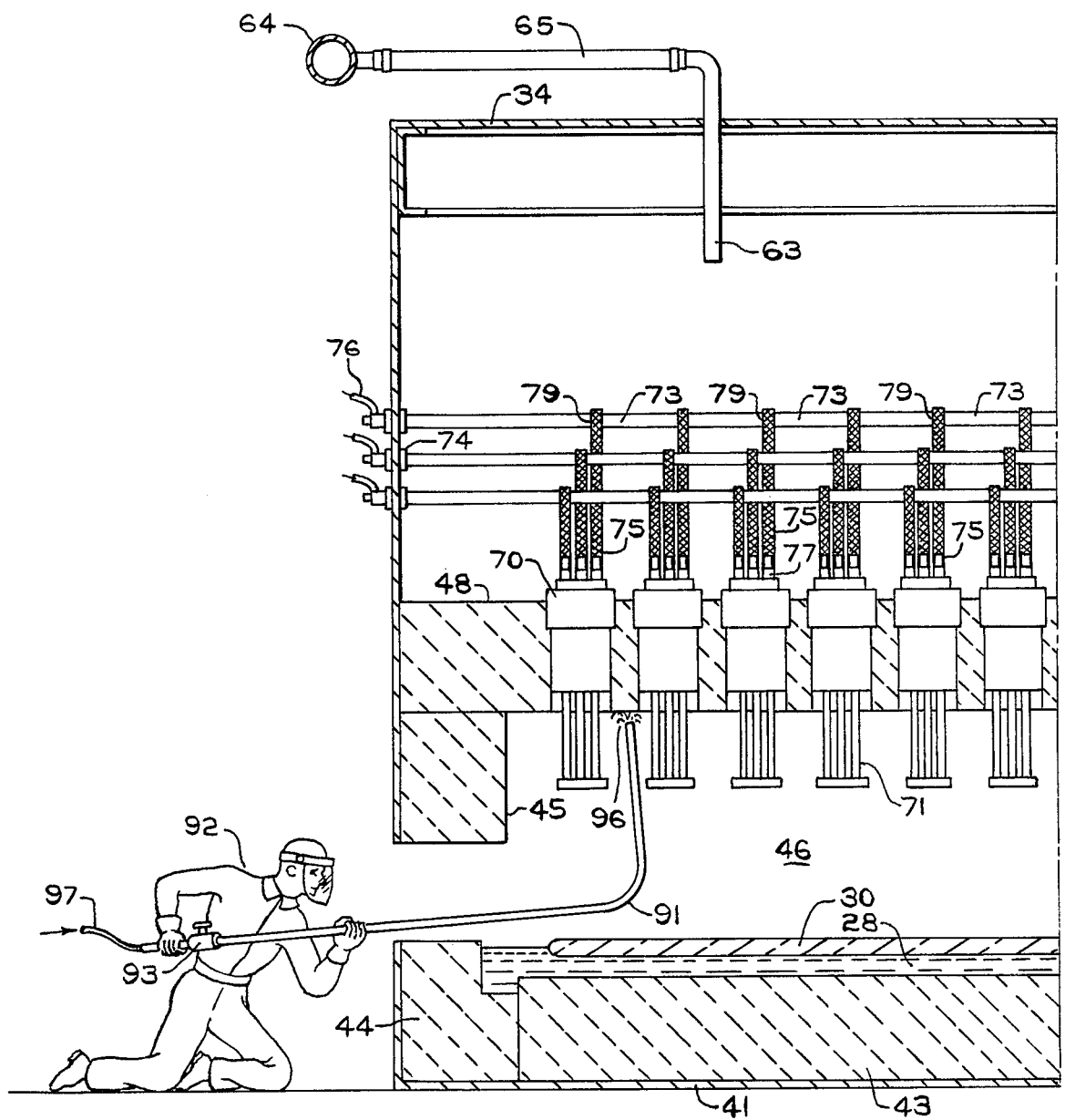
FIG. 2 is a prospective fragmentary view representing performance of the invention.

As illustrated in FIG. 2, a lance 91 having a curved end is inserted by hand by a worker such as 92 who will turn the lance on and off by valve 93. The lance having a curved end 96 directs the flow of gases exiting from the lance onto the candles of 71 and the surrounding roof areas. The gases in accordance with the invention are heated such that they aid in dislodging of elemental molten tin and further will cause the rapid sublimation of tin sulfide. The heated gas temperatures of the invention are suitably above 800° F. (about 425° C.). A preferred temperature for the discharged gas is between about 1100° and about 1620° F. (about 590° C. and about 880° C.) because the tin sulfide sublimes rapidly in this range without much melting of the tin sulfide. The length of time during which the lance of heated gases is directed at the deposits is any time sufficient to result in cleaning of the roof. The force of the gas may be regulated to whatever is desired. Higher pressures, of course, clean faster but are more expensive and also more difficult to control.

In one form of the invention it is possible that a sulfur containing gas is added to the forming or nitrogen gas utilized in the lance. The heated sulfur containing gas will react with elemental tin on the roof converting it to tin sulfide which will sublime. At the preferred temperatures of the invention, the sublimation vapor pressure of tin sulfide (7.0 mm of Hg) is approximately 100,000 times greater than the vapor pressure for elemental tin ($3 \times 10^{-5}$ mm of Hg). Therefore, the conversion to tin sulfide by a sulfur containing gas is advantageous in aiding more efficient cleaning.

Any suitable sulfur containing gas may be utilized. Among suitable gases are sulfur, and carbon sulfide. The preferred is hydrogen sulfide as it does not introduce new materials into the forming chamber and further reacts well with the elemental tin to produce tin sulfide. A low concentration of hydrogen sulfide in the gas of about 30 parts per million provides satisfactory results.

The predominant gas for the lance may be any gas inert in the forming chamber environment. Oxygen may not be present in the gas for the lance as it will react with the tin of the bath. A preferred gas is nitrogen. It is preferred that nitrogen only be used with hydrogen sulfide in order to not have a tendency to reconvert the tin sulfide back to elemental tin which could happen if the conventional nitrogen and hydrogen forming gas mixture was utilized in the lance. The gas entering the lance 91 by means of flexible piping 97 may be heated by any suitable means (not shown). Among suitable means are an electraplasma heater in the gas line, a gas preheater such as an electric coil or passing the gas through a coil that is in contact with a heated liquid or gas such as a heat exchange coil contacting the glass melting furnace.

While this invention has been described by reference to specific embodiments, those skilled in the art will recognize that variations can be made from those specific embodiments without departing from the scope of the invention. For instance, while the pipe for the application of the heated gas to the forming chamber roof is illustrated as a single hand held pipe, the invention could be in the form of several pipes controlled by machine or by hand. Further, other bends could be used in the pipe in order to give access to different portions of the roof. Further, it is consistent with the invention to either carry out extensive cleaning of the roof such that substantially all areas of the roof are contacted for cleaning with the heated gases of the invention or the invention could be carried out with only spot cleaning of particularly dirty or problem areas.

Accordingly, the scope of this invention is not to be construed as being limited to its disclosed specific embodiments. Rather, the invention is defined by the following claims.

I claim:

1. A method of periodically removing from interior surfaces of a glass forming chamber containing molten tin, tin-containing deposits that build up on the interior surfaces, comprising inserting into the forming chamber movable conduit means, from the end of which issues a stream of gas which will not promote oxidation of tin to tin oxide within the forming chamber, preheating the gas to a temperature of at least 800° F. before passage through the conduit, directing the stream of preheated gas issuing from the conduit at a minor portion of the interior surfaces with sufficient force to mechanically dislodge and to volatilize the deposits from that portion of the surface, moving the conduit to direct the stream at other portions of the interior surfaces so as to incrementally remove deposits from the interior surfaces, withdrawing the conduit from the forming chamber and resuming normal operation of the forming chamber.

2. The method of claim 1 wherein the gas is preheated to a temperature between about 1100° F. and about 1620° F.

3. The method of claim 1 or 2 wherein the gas is a sulfur-containing gas.

4. The method of claim 3 wherein the gas includes hydrogen sulfide.

5. The method of claim 4 wherein the gas includes nitrogen.

6. The method of claim 5 wherein the gas consists essentially of a mixture of nitrogen and hydrogen sulfide.

7. The method of claim 1 or 2 wherein the gas includes nitrogen.

8. The method of claim 7 wherein the gas consists essentially of nitrogen.

9. The method of claim 1 wherein the tin-containing deposits include tin sulfide.

* * * * *